United States Patent
Berger (10) Patent No.: US 7,061,690 B1
(45) Date of Patent: Jun. 13, 2006

(54) APPARATUS FOR ESTABLISHING SUBSTANTIALLY UNIFORM DISTRIBUTION OF LIGHT

(75) Inventor: Valeriy K. Berger, Plano, TX (US)

(73) Assignee: Luminator Holding, L.P., Plano, TX (US)

( * ) Notice: Subject to any disclaimer, the term of this patent is extended or adjusted under 35 U.S.C. 154(b) by 0 days.

(21) Appl. No.: 11/062,129

(22) Filed: Feb. 18, 2005

(51) Int. Cl.
*G02B 13/18* (2006.01)
*G02B 3/02* (2006.01)

(52) U.S. Cl. .................................. 359/708
(58) Field of Classification Search ............... 359/708, 359/712, 726, 727; 362/551, 552, 335
See application file for complete search history.

(56) References Cited

U.S. PATENT DOCUMENTS

| | | | | |
|---|---|---|---|---|
| 1,824,429 A | * | 9/1931 | Goss | 362/298 |
| 5,692,827 A | * | 12/1997 | Chinniah et al. | 362/336 |
| 6,471,375 B1 | * | 10/2002 | Kobayashi et al. | 362/335 |
| 6,688,756 B1 | * | 2/2004 | Akiyama | 362/268 |

* cited by examiner

*Primary Examiner*—Alicia M Harrington
(74) *Attorney, Agent, or Firm*—Jenkens & Gilchrist, PC (57) ABSTRACT

A device that includes a parabolic or hyperbolic lens that operates by receiving a uniform or non-uniform input light beam and produces a relatively uniform illumination of an illumination surface.

16 Claims, 6 Drawing Sheets

APPARATUS FOR ESTABLISHING SUBSTANTIALLY UNIFORM DISTRIBUTION OF LIGHT

BACKGROUND OF THE INVENTION

1. Field of the Invention

The present invention concerns a lens device that aides in delivering a uniform distribution of light from a light source.

2. Background of the Invention

In many applications, from flashlights to lasers, obtaining a uniform distribution of light from a light source has been a long-standing problem. The tendency of a light source to illuminate a surface with greater intensity in the central part of the illumination area as compared with the peripheral portions of the illumination area can be frustrating. Even when the input light from a light source (i.e., before a lens) is a substantially parallel uniform beam, the output distribution of light (after the lens) on a designated surface is not be uniform. The light intensity is higher for the central region of a spherical lens than for the outlying region or angles.

BRIEF SUMMARY OF THE INVENTION

An embodiment of the invention distributes light onto an output surface in a substantially uniform manner. A concave hyperbolic surface provides an input surface of a lens for an impinging light beam. The output surface of the lens is substantially flat or smooth. The combination of the input and output surfaces of the hyperbolic lens produce an output light beam that spreads in such a manner to illuminate a surface with a substantially equal illuminance from the center to the periphery of the illumination area on the output surface.

Another embodiment of the present invention comprises a plurality of concave hyperbolic pillows embedded in a lens structure for a tail light or marker light on an automobile or airplane. The concave hyperbolic pillow lens can also be used as a ceiling light fixture or covering for an interior lamp in a recreational vehicle, automobile, train or airplane.

Embodiments of the present invention spread or diffuse a light beam to provide substantially uniform light coverage of a designated area.

BRIEF DESCRIPTION OF THE DRAWINGS

A more complete understanding of the system and method of the present invention may be obtained by reference to the following Detailed Description when taken in conjunction with the accompanying Drawings wherein.

DETAILED DESCRIPTION OF THE INVENTION

Exemplary embodiments of the present invention will now be described more fully hereinafter with reference to the accompanying drawings in which exemplary embodiments of the invention are shown. The invention, however, may be embodied in many different forms and should not be construed as being limited to the embodiments set forth herein. Rather, the embodiments are provided so that this disclosure will be thorough and complete, and will fully convey the scope of the invention to those skilled in the art.

Figure 1:
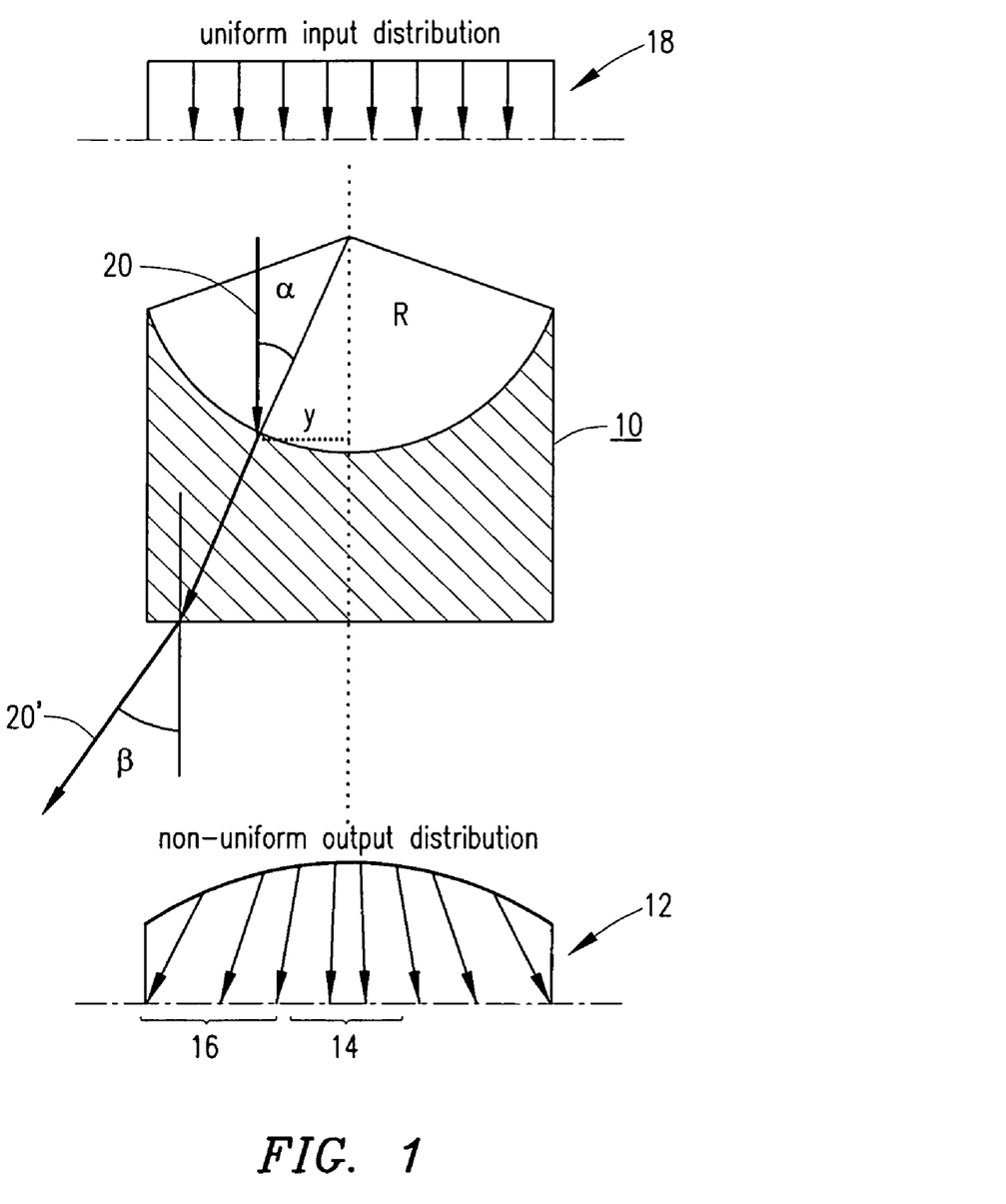
FIG. 1 depicts a concave, spherical pillow lens and a resulting non-uniform output distribution.

Referring to FIG. 1, when using concave spherical pillow optics in, for example, an automotive headlight lens a non-uniform distribution of light is produced. The light emitted 12 from the lens 10 is more intense in the central portion 14 of the emitted light pattern 12 then at the periphery 16 of the emitted light pattern 12. This result occurs even if the input light 18, the light before the lens 10, has a uniform distribution or consists of a uniform parallel light beam. The concave spherical pillow lens 10 provides a higher intensity beam for central directions and a lesser intensity for outlying angles.

Still referring to FIG. 1, it is relatively easy to understand and show why a spherical pillow lens 10 provides a non-uniform distribution of light output. For any light ray 20, the dependence of the output angle $\beta$ and the input angle $\alpha$ follows the expression:

$$\beta = \text{ArcSin}\left[\text{Sin } \alpha(\sqrt{n^2 - \text{Sin}^2\alpha} - \cos \alpha)\right] \tag{1}$$

n is the refraction index of the lens; $\alpha$ is the angle of incidence relative to the radius (FIG. 1) and $\beta$ is the deflection angle of the output ray 20.

If y is the "position" of the input ray with respect to the center of the concave pillow (see FIG. 1), then one can write:

$$\text{Sin}\alpha = \frac{y}{R}; \quad \text{Cos}\alpha = \sqrt{1 - \frac{y^2}{R^2}}$$

Equation (1), in this case, can be rewritten into:

$$\beta = \text{ArcSin}\left[\frac{y}{R}\left(\sqrt{n^2 - \frac{y^2}{R^2}} - \sqrt{1 - \frac{y^2}{R^2}}\right)\right] \tag{2}$$

Figure 2:
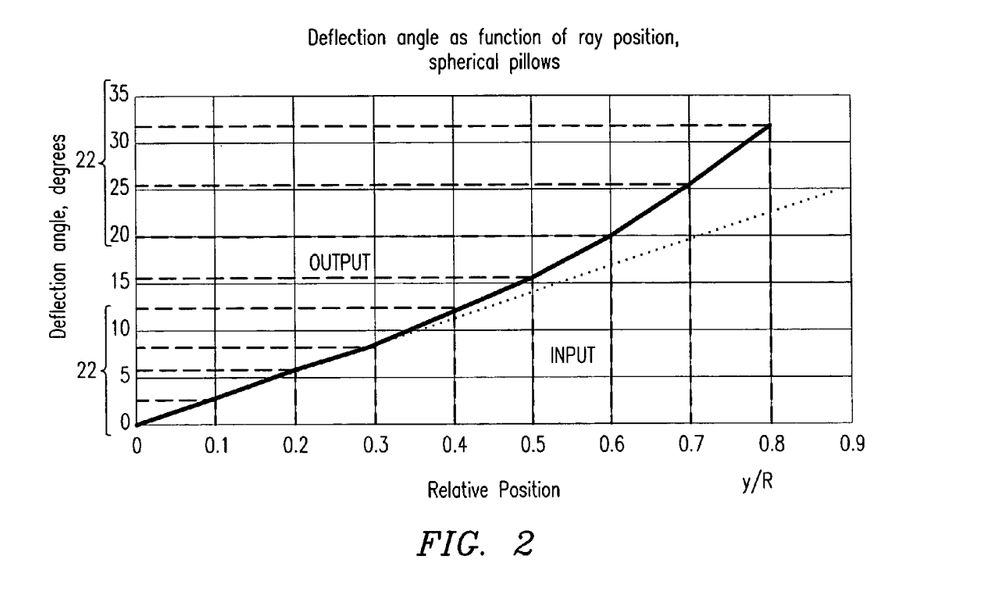
FIG. 2 depicts a graph of deflection angle as a function of light ray position for a concave spherical pillow lens.

In FIG. 2, the deflection angle $\beta$ as a function of an input ray position y is shown. The vertical dashed lines in FIG. 2 correspond to equally spaced input rays 18 before the concave spherical lens 10. One must assume here that there is a relative dimensionless distance y/R of 0.1 between each adjacent incoming ray 18. The horizontal dashed lines correspond to the output light rays 20' of FIG. 1. The graph reveals the deflection angles between adjacent rays change with respect to the distance the input ray is from the center of the lens 10. The output rays 20' are closer together 22 near the center of the concave spherical lens than near the periphery 24. The result being that the resulting light intensity of the output light 12, 20' is higher in the center area and lower in the outer or periphery of the concave pillow lens 10.

Figure 3:
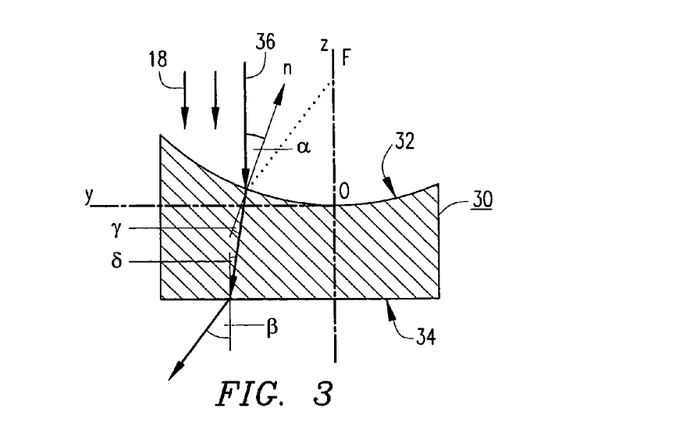
FIG. 3 depicts an exemplary concave parabolic pillow lens.

Referring now to a parabolic pillow lens 30, which is one embodiment of the present invention, in FIG. 3, the input surface 32 of the concave parabolic lens 30 is parabolic. Incident light 18, being parallel or otherwise, impinges on the input parabolic surface 32. The output surface 34 of the exemplary parabolic concave lens 30 is substantially flat and smooth. The equation that describes a parabola is written in the form:

$$z = \frac{1}{4f} y^2 + b \tag{3}$$

Here f is the focal distance FO of the parabola and the parabolic input surface 32; and b can be equal to zero for simplicity.

Here n is the normal to the input surface 32. The equation for normal n to the input surface 32 is $$z - z_0 = -\frac{1}{(dz/dy)_0}(y - y_0) \tag{4}$$

Where $(dz/i)_0$ is the derivative of the parabolic surface; $y_0$, $z_0$ and $(dz/dy)_0$ are taken at the point where the input light ray crosses the parabolic input surface 32.

Hence the equation for the normal n can be written as:

$$z - z_0 = -\frac{2f}{y_0}(y - y_0)_5 \tag{5}$$

wherein the derivative of the normal n is:

$$\frac{dz}{dy} = -\frac{2f}{y_0} \tag{6}$$

Quantitatively one can write:

$$Ctg\, \alpha = \frac{dz}{dy} = \frac{2f}{y_{00030}} \tag{7}$$

In order to express the output angle β of the parabolic lens 30 in relation to the position y of incident ray 18, 36 refraction equations are written:

$$\text{Sin } \alpha = n \text{ Sin } \gamma \text{ and } n \text{ Sin } \delta = \text{Sin } \beta \tag{8}$$

Besides $$\gamma + \delta + \pi - \alpha = \pi \Longrightarrow \delta = \alpha - \gamma$$

As the result, we can write the system of consequent equations, from which the dependence α(y) is derived:

$$\alpha = \text{ArcCtg}\left(\frac{2f}{y}\right) \quad \gamma = \text{ArcSin}\left(\frac{\text{Sin } \alpha}{n}\right) \tag{9}$$

$$\delta = \alpha - \gamma \quad \beta = \text{ArcSin}(n \text{ Sin } \delta)$$

This system of equations provides the dependence of β(y) after the calculations. The dependence of β(y) can be derived in an explicit form by using equations (9) and a few trigonometric transformations. As such an express for β(y) results as:

$$\beta(y) = \text{ArcSin}\left\{\frac{1}{1 + \left(\frac{2}{y/f}\right)^2}\left[\sqrt{n^2\left[1 + \left(\frac{2}{y/f}\right)^2\right]} - 1 - \frac{2}{y/f}\right]\right\} \tag{10}$$

the dimensionless variable y/f is introduced. y/f is proportional to y.

Figure 4:
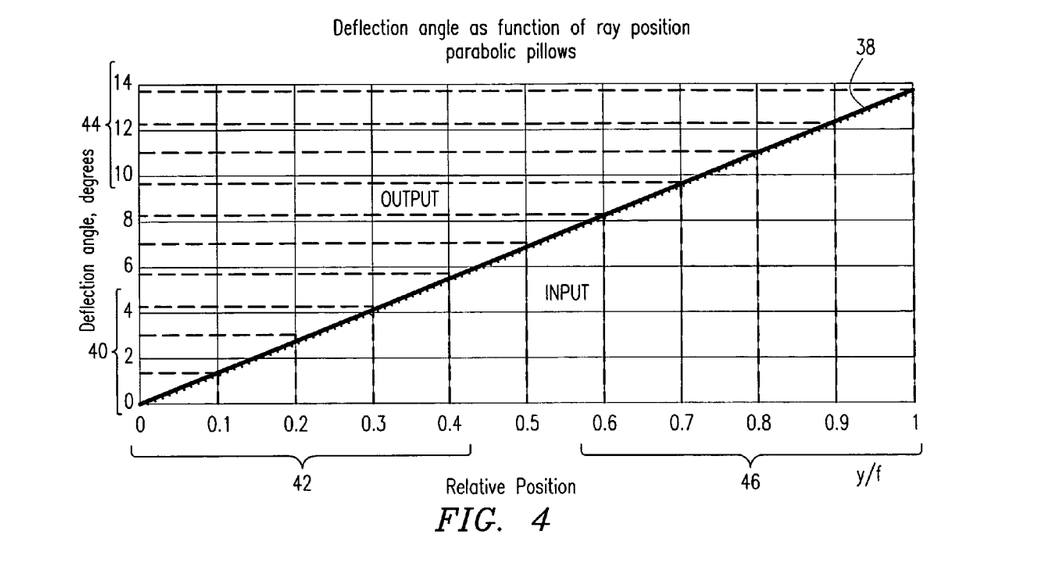
FIG. 4 provides a graph of the deflection angle as a function of light ray position for an exemplary concave parabolic pillow lens.

As shown in FIG. 4 the β(y) dependence is close to a straight line 38. The distance between adjacent input light rays (the vertical dotted lines) is substantially the same. The resulting distance between the output light rays (the horizontal lines) are also substantially the same. Hence if an input light beam 18 contains a parallel uniform light before interacting with the exemplary concave parabolic pillow lens 30, then the output light rays will spread and establish a substantially uniform light pattern after the exemplary concave parabolic pillow lens. The central part 40 of the output light pattern has uniform relative Intensity pattern as well as input light pattern 42 Intensity. The same can be said about the peripheral part 44 of the output light pattern. A parabolic pillow 30 does not correct a non-uniform input light pattern or distribution to make the output distribution of light more uniform or smoother.

An exemplary hyperbolic lens, pillow, plurality of pillows, array or cylinder lens in accordance with embodiments of the present invention can be used to smooth or more evenly distribute output light from a uniform or substantially non-uniform input light source.

Generally, FIG. 3 can also be used to aid in explaining the analysis of an exemplary hyperbolic lens 30. Assume for this explanation that FIG. 3 depicts an exemplary concave hyperbolic pillow lens 30, rather than a parabolic lens. The general equation for a hyperbola is:

$$\frac{z^2}{a^2} - \frac{y^2}{b^2} = 1 \tag{11}$$

Figure 5:
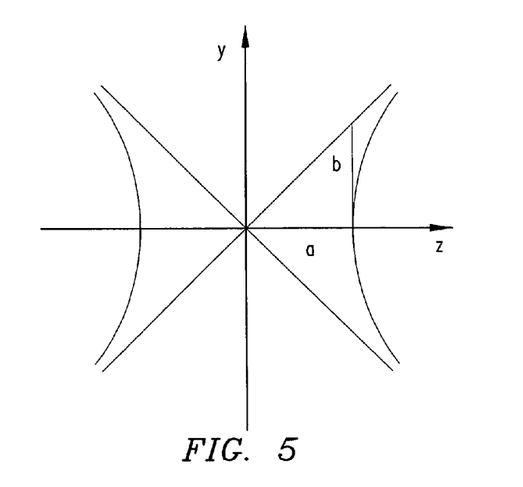
FIG. 5 provides a depiction of a hyperbolic equation in graph form.

A graph representing the hyperbolic equation (11) is found at FIG. 5.

For the concave hyperbolic input surface 32:

$$z = a\sqrt{1 + \frac{y^2}{b^2}}$$

and the equation for the normal n to the concave hyperbolic input surface 32 can be derived from equation (4) as:

$$z - z_0 = -\frac{b\sqrt{b^2 + y_0^2}}{ay_0}(y - y_0)$$

Therefore, the derivative for the normal n at a point $y_0$, $z_0$ (quantitatively) is:

$$Ctg\alpha = \left(\frac{dz}{dy}\right)_{y_0} = \frac{b\sqrt{b^2 + y_0^2}}{ay_0} \quad (12)$$

As a result, the system of equations from equations (9) can be used, except the first equation of the system will be different:

$$\alpha = \text{ArcCtg}\left(\frac{b\sqrt{b^2 + y_0^2}}{ay_0}\right) \quad (9')$$

In explicit form, the function $\beta(y)$ can be expressed either as the result after appropriate transformations of equations (9) and (9') as:

$$\beta = \text{ArcSin}\left\{\frac{ay}{b^4 + y^2(a^2 + b^2)}\left[\sqrt{n^2(b^4 + y^2(a^2 + b^2)) - a^2 y^2} - b\sqrt{b^2 + y^2}\right]\right\} \quad (13)$$

or for simplicity one can assume $b=\alpha$, and the last relation can be rewritten in the form of:

$$\beta = \text{ArcSin}\left\{\frac{y/a}{1 + 2y^2/a^2}\left[\sqrt{n^2(1 + 2y^2/a^2) - y^2/a^2} - \sqrt{1 + y^2/a^2}\right]\right\} \quad (13')$$

Figure 6:
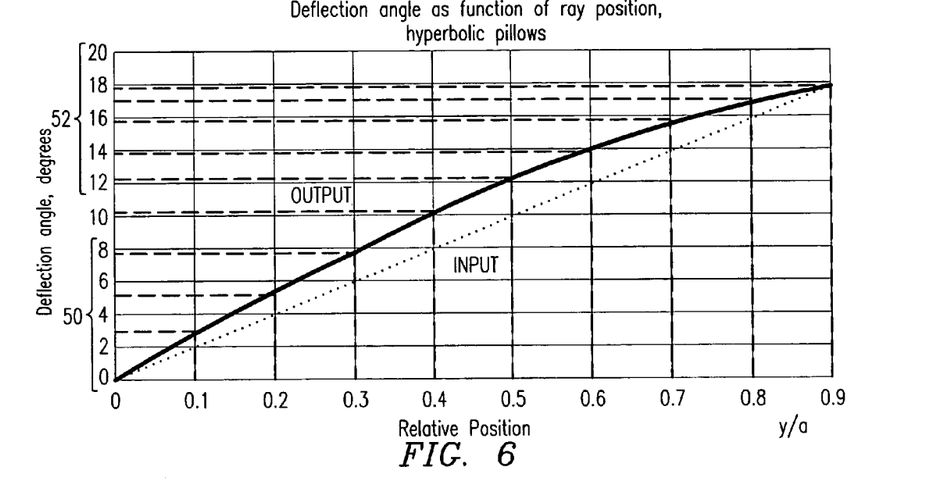
FIG. 6 provides a graph of the deflection angle as a function of light ray position for an exemplary concave hyperbolic pillow lens.
Figure 7:
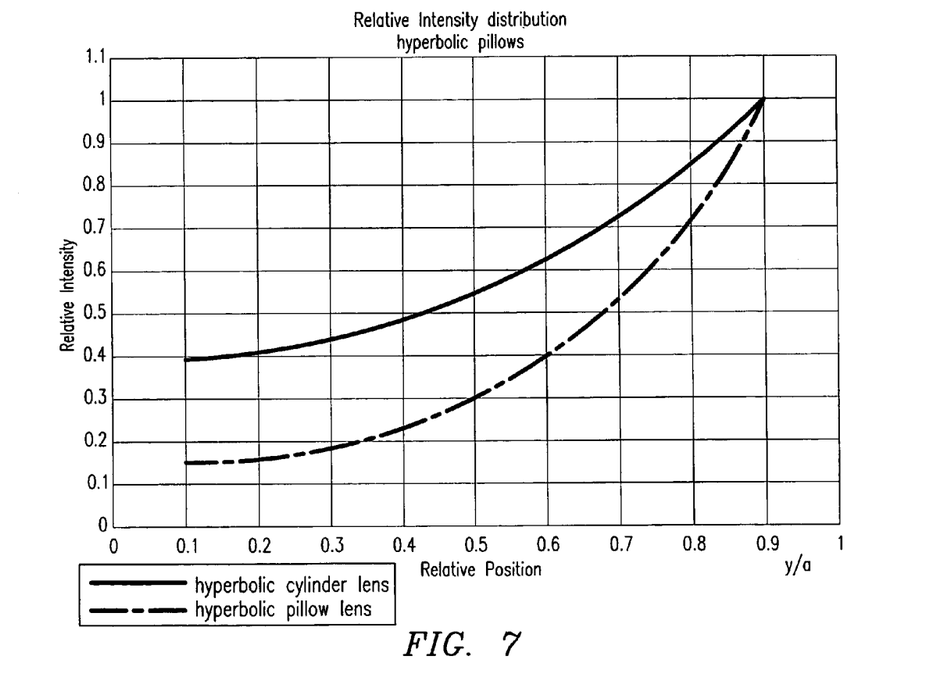
FIG. 7 provides a graph of the relative intensity distribution of exemplary hyperbolic pillows.

Thus, the dependence of the deflection angle $\beta$ as a function of the dimensionless parameter $y/\alpha$ for a hyperbolic pillow lens is shown in FIG. 6. FIG. 6 depicts a graph showing the deflection angle of a light ray in a hyperbolic pillow lens as a function of the input light ray position. A uniform input light beam that impinges on the input side of an exemplary hyperbolic pillow lens will provide a non-uniform output array of light. That is, the angular distance between adjacent output beam rays is greater in the central part 50 of an exemplary hyperbolic lens than in the peripheral part 52 of the hyperbolic lens. The resulting concentration of output light rays is increased on the peripheral part of a resulting output light beam thereby making the illuminance of the resulting light projection relatively uniform. The relative intensity distribution graph for an exemplary hyperbolic pillow lens of FIG. 7 confirms that the relative Intensity of the output light from either an exemplary hyperbolic cylinder lens or hyperbolic pillow lens. It is also noted that an exemplary hyperbolic pillow lens or hyperbolic cylindrical lens can accept light from a non-uniform light source having a higher intensity of right rays impinging on the central input surface of the lens with respect to the peripheral input surface of the lens.

Figure 8:
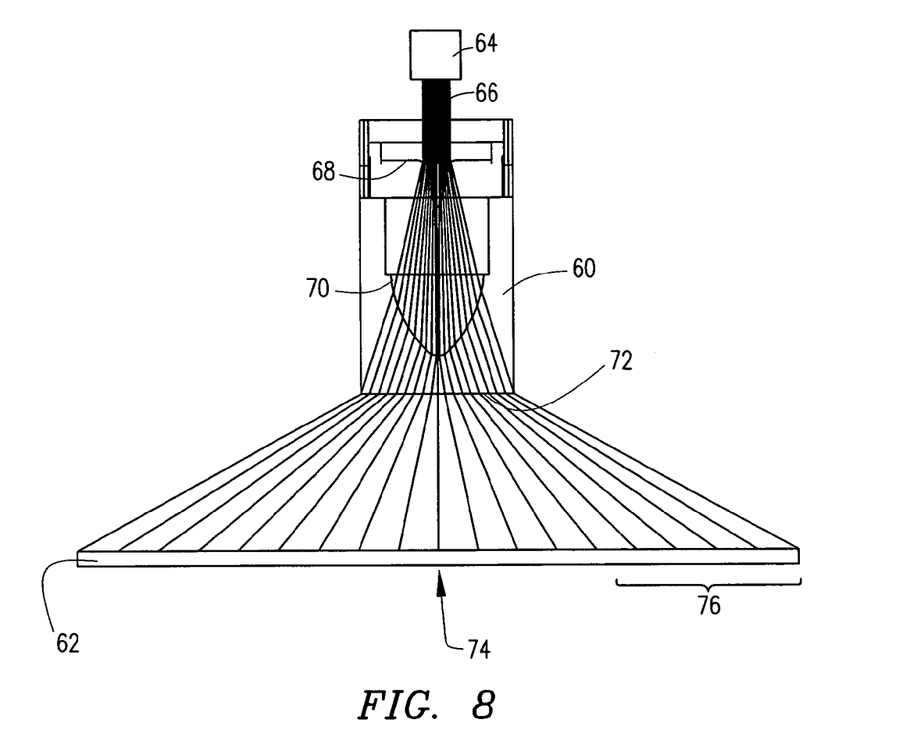
FIG. 8 is a depiction of an exemplary hyperbolic lens according to one embodiment of the invention.

An exemplary embodiment and method of using the properties associated with an exemplary hyperbolic lens 60 is shown in FIG. 8. An exemplary hyperbolic lens is used to create a substantially uniform (more or less) illuminance on a target area 62. A light source 64 provides light. The light source 64 can be a laser, an automobile headlight, a light emitting diode (LED), a light bulb, a flood light, or a halogen light source. Here the light source 64 from a laser (or other source) which is providing a substantially parallel input light beam 66. The input light may pass through a diffuser 68 so that the input light beam spreads enough to cover and impinge on the input surface 70 of the exemplary hyperbolic lens 60.

The input surface 70 of the exemplary hyperbolic lens 60 is a concave hyperbolic surface. The concave hyperbolic input surface may be elongated in a direction making a hyperbolic trough or cylinder style lens. The concave hyperbolic input surface may also have a round cross-sectional shape perpendicular to the input light beam 66.

As the input light travels through the exemplary hyperbolic lens the light rays are refracted such that the light intensity is less in the central part of the output surface 72 than at the periphery of the output surface 72. The output surface 72 is substantially flat and smooth.

The distance from the output surface 72 to the target surface 62 increases gradually from the center 74 to the edge or periphery 76 of the target surface 62. Furthermore, the cosine of the incidence angle decreases from the center of the target area. These circumstances associated with the distribution of light illuminance on a target area 62 usually result in the creation a substantially uniform light distribution on the target area 62 from an exemplary concave hyperbolic pillow lens. In spite of output light intensity of an exemplary hyperbolic lens being lower in the central portion of the output surface 72, then the periphery of the output surface, the resultant illuminance on the target area 62 is substantially uniform. The substantial uniformity of illuminance on the target area 62 is due to the gradually increasing distance of the target surface 62 from the output surface 72 and the rate of change of the deflection angle from the center of the lens to the periphery of the lens. In FIG. 6, the solid arced line indicates that the change of the deflection angle decreases as the relative position of input the light moves further from the center of the exemplary concave hyperbolic lens.

Figure 9:
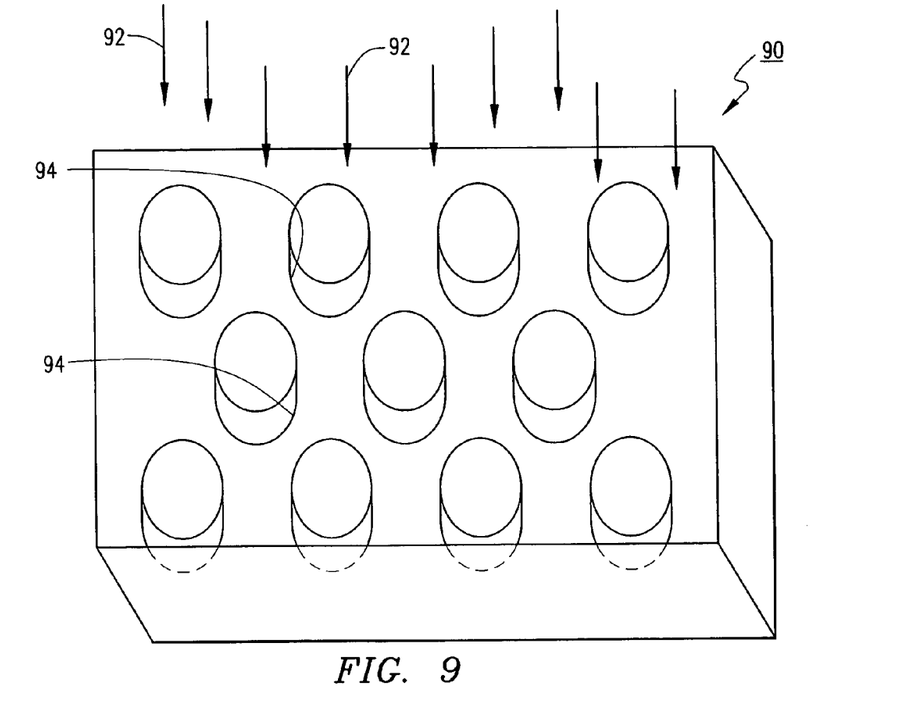
FIG. 9 is a depiction of an array of hyperbolic pillow lenses according to an embodiment of the invention.

FIG. 9 depicts an array of exemplary concave hyperbolic pillows 90. Such an array could be used for automobile turn signal lenses, headlamp or flood light or lenses, wherever a substantially uniform pattern of projected light is desired. Input light 92 from a bulb or light producing element (uniform or non-uniform) impinges on the input surface of the exemplary convex hyperbolic pillow array lens. The array of convex hyperbolic pillows will each spread the input light, as discussed in FIG. 8, and provide a substantially uniform illumination pattern on a desired target surface.

Figure 10:
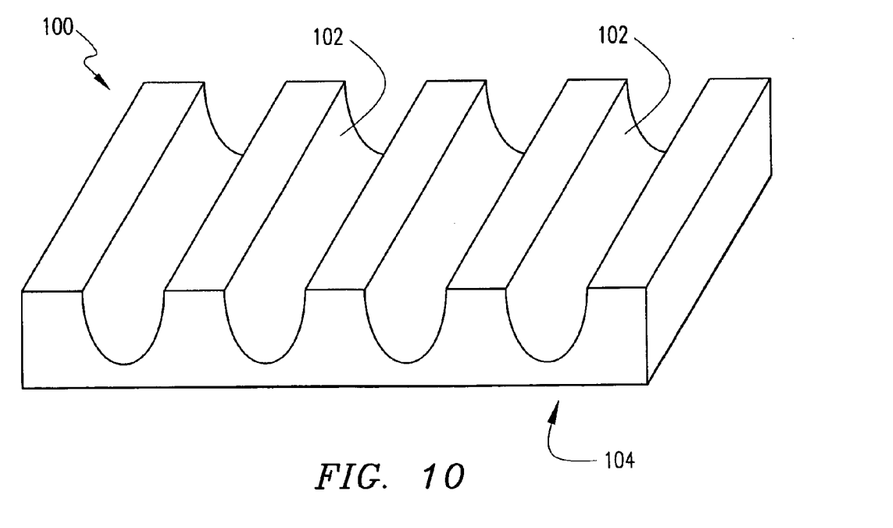
FIG. 10 is a depiction of an array of hyperbolic troughs or cylindrical pillow according to an embodiment of the invention.

FIG. 10 depicts an array of trough or cylindrical hyperbolic concave lenses 100. Each trough 102 or cylindrical lens may be used to aid in uniformly distributing light onto a target surface. The input surface of each trough 102 is a hyperbolic curve and the output surface 104 is substantially smooth and flat.

Various embodiments of the exemplary hyperbolic concave pillow lens have been disclosed. It is understood that the lens can be made of plastic, glass, or other substances that can be molded, etched, or machined to establish the hyperbolic input surface or surfaces. Also the exemplary lenses need not be perfectly clear, but instead may also be translucent for example for automotive or aircraft tail or marker light covers or colored floodlight covers. Furthermore, the output surface may, in some exemplary embodiments not be smooth, but instead have bumps or ridges to further diffuse the output light beam.

The previous description is of preferred embodiments for implementing the invention, and the scope of the invention should not necessarily be limited by these descriptions. The scope of the present invention is instead defined by the following claims.

The invention claimed is:

1. A device for distributing light onto output surface comprising
    a input surface comprising a concave hyperbolic input surface for receiving input light;
    an output surface that is substantially flat, said combination of said input surface and said output surface combine to produce an output light beam such that the angular distance between adjacent output light beam rays is greater in a central output portion of the output surface than in a peripheral portion of the output surface.

2. The device of claim 1, further comprising a plurality of concave hyperbolic input surfaces.

3. The device of claim 1, further comprising a plurality of concave hyperbolic input surfaces in the form of troughs.

4. The device of claim 1, wherein said input light is from a laser.

5. The device of claim 1, wherein said input light is from a light bulb.

6. The device of claim 1, wherein said input device is a LED.

7. A pillow lens comprising:
    a lens material an input surface in said lens material, said input surface comprising a plurality of concave hyperbolic curves;
    an output surface, opposing said input surface, in said lens material, said output surface being substantially flat;
    said combination of said input surface and said output surface diffracting input light such that the deflection angle β of an output light ray follows the equation $$\beta = \text{ArcSin}\left\{ \frac{y/a}{1+2_y{}^2/a^2} \left[ \sqrt{n^2(1+2y^2/a^2) - y^2/a^2} - \sqrt{1+y^2/a^2} \right] \right\} \quad (13')$$

wherein n is the normal to the input surface, y is the position of an input ray with respect to the center of a hyperbolic curve, a is the location of the vertex with respect to the center of the hyperbola;

said pillow lens for providing a substantially uniform illumination on a target location.

8. The pillow lens of claim 7, wherein said lens material is clear.

9. The pillow lens of claim 7, wherein said lens material is translucent.

10. The pillow lens of claim 7, wherein said plurality of concave hyperbolic curves are formed into a hyperbolic trough.

11. The pillow lens of claim 7, wherein said plurality of concave hyperbolic curves are formed into a plurality of hyperbolic cups.

12. A device for providing a substantially uniform illumination of a target surface, said device comprising:
    a light source for providing a light beam; and
    a concave hyperbolic lens, said light source being directed at said concave hyperbolic lens, said concave hyperbolic lens comprising:
        an input surface having a concave hyperbolic pillow and
        a substantially flat output surface;
    said light beam being output from said concave hyperbolic lens such that the light intensity in the center of the substantially flat output surface is less than at the periphery of said substantially flat output surface.

13. The device of claim 12, further comprising a diffuser between said light source and said concave hyperbolic lens.

14. The device of claim 12, wherein said light source is a laser.

15. The device of claim 12, wherein said light source is a flood light.

16. The device claim 12, wherein said light source is a LED.

* * * * *

UNITED STATES PATENT AND TRADEMARK OFFICE
CERTIFICATE OF CORRECTION

PATENT NO. : 7,061,690 B1
APPLICATION NO. : 11/062129
DATED : June 13, 2006
INVENTOR(S) : Valeriy K. Berger It is certified that error appears in the above-identified patent and that said Letters Patent is hereby corrected as shown below:

Column 3, line 25    Replace "$(dz/i)_o$"
                     With --$(dz/dy)_o$--

Column 3, Equation 5    Replace

" $z - z_0 = -\dfrac{2f}{y_0}(y - y_0)_5$ "

With

-- $z - z_0 = -\dfrac{2f}{y_0}(y - y_0)$ --

Column 3, Equation 7    Replace

"$Ctg\ \alpha = \dfrac{dz}{dy} = \dfrac{2f}{y_{00030}}$"

With

--$Ctg\ \alpha = \dfrac{dz}{dy} = \dfrac{2f}{y_0}$--

Column 3, line 59    Replace "$\alpha(y)$"
                     With --$\beta(y)$--

UNITED STATES PATENT AND TRADEMARK OFFICE
CERTIFICATE OF CORRECTION

PATENT NO. : 7,061,690 B1
APPLICATION NO. : 11/062129
DATED : June 13, 2006
INVENTOR(S) : Valeriy K. Berger It is certified that error appears in the above-identified patent and that said Letters Patent is hereby corrected as shown below:

Column 5, line 58        Replace "right rays"
                         With --light rays--

Signed and Sealed this

Tenth Day of April, 2007

JON W. DUDAS
*Director of the United States Patent and Trademark Office*